United States Patent [19]

Opfer et al.

[11] Patent Number: 4,631,202
[45] Date of Patent: Dec. 23, 1986

[54] THIN FILM MAGNETIC RECORDING FILM

[75] Inventors: James E. Opfer, Palo Alto; Bangalore R. Natarajan, San Jose, both of Calif.

[73] Assignee: Hewlett-Packard Company, Palo Alto, Calif.

[21] Appl. No.: 853,870

[22] Filed: Apr. 21, 1986

Related U.S. Application Data

[62] Division of Ser. No. 549,331, Nov. 3, 1983, Pat. No. 4,610,911.

[51] Int. Cl.$^4$ ............................................. H01F 10/02
[52] U.S. Cl. .................................... 427/131; 427/132
[58] Field of Search ............... 427/131, 132; 428/900, 428/928, 694

Primary Examiner—Bernard D. Pianalto
Attorney, Agent, or Firm—Leslie G. Murray

[57] ABSTRACT

A thin film magnetic recording disc is provided wherein the magnetic layer is an alloy of cobalt and platinum disposed on a chromium layer. A barrier layer of chromium is formed on the cobalt-platinum film and a wear layer of an oxide of cobalt is provided on the barrier layer. The platinum content in the magnetic film is varied so as to provide a magnetic film with a desired coercivity which is significantly less dependent upon film thickness. This permits the cobalt-platinum film thickness to be adjusted to meet a wide range of recording system design parameters. The coercivity of the magnetic film may be determined primarily by the amount of platinum in the alloy and the saturation magnetization-thickness product of the film is determined primarily by the film thickness.

30 Claims, 3 Drawing Figures

THIN FILM MAGNETIC RECORDING FILM

This is a division of application Ser. No. 549,331, filed Nov. 3, 1983 now U.S. Pat. No. 4,610,911.

BACKGROUND OF THE INVENTION

This invention relates to magnetic recording media or discs and in particular to a magnetic disc structure which is characterized by having excellent magnetic recording, and wear properties and stability-against-oxidation of the magnetic layer. More particularly, the invention relates to a novel combination of materials, each in a thin film form constituting a magnetic recording disc. Further, the invention relates to methods for forming magnetic materials and controlling the magnetic properties thereof so as to provide magnetic recording media having magnetic properties which are selectively variable over a desirable range in order to facilitate optimization of recording system design.

In designing a magnetic recording disc, there are a number of factors, depending upon the properties of available recording heads, that must be considered and provided for. Among the magnetic properties that are desirable, especially where high magnetic recording density is an object, is a high coercivity limited only by the write capability of the recording head. The recording system also requires that the head signal output of the recording head be greater than some minimum value. It is required in turn for thin recording films that the product of the magnetic recording film thickness and its remanent magnetization (hereinafter referred to as the magnetization-thickness product) be greater than some corresponding minimum value. In addition, the high coercivity and desired magnetization-thickness product should be accompanied by a high degree of squareness of the M-H hysteresis loop of the magnetic film. With the given values of coercivity and magnetization-thickness product established, the recording density is desirably the maximum value that is consistent with the minimum value of resolution for the recording process. Because resolution generally decreases both with increasing recording density and with an increasing value of the ratio of the magnetization-thickness product to coercivity, optimization of the recording system requires that the disc coercivity and its magnetization-thickness product be essentially the corresponding maximum and minimum values established above. Any value of magnetization-thickness product greater than its minimum value and any value of coercivity less than its maximum value necessarily results in a recording density less than what would otherwise be achievable with the recording head. Hence, there exists a need to vary the coercivity and magnetization-thickness product independently. Further, the values of these parameters need to change as improved recording heads become available and there is, therefore, an additional need for independent variability of coercivity and magnetization-thickness product over a rather large range of values. Another important constraint is that the necessary independent variability of magnetic properties be achievable on smooth substrates which are suitable for use as the mechanical support for the recording disc. It is also desirable that once a process to achieve targeted or predetermined magnetic properties is in place, minor independent adjustments to the magnetic properties can be readily made by means of relatively easy and straight forward changes in process parameters.

The magnetic recording film properties of cobalt-platinum (Co-Pt) alloys are known and have been reported to some extent. See, for example, the paper by M. Naoe et al., entitled "Preparation of High Coercivity Co-Pt Alloy Films by Targets-Facing Type of High Rate Sputtering," *Intermag* 1983, digest AC-5. These authors showed that a maximum coercivity of about 1600 Oe was achieved with a Co-Pt alloy in which the platinum content was of about 20 atomic percent. Their films were deposited on glass substrates with a dc magnetic field of about 125 Oe in the plane of the film. M. Yanagisawa et al., in a paper entitled "Corrosion-Resisting Co-Pt Thin Film Medium for High Density Recording," *Intermag* 1983, digest AC-6, describe sputtered Co-Pt thin films which showed similar results. A. J. Griest, Jr., in U.S. Pat. No. 3,755,796, discloses cobalt-platinum alloys for use in magnetic domain (magnetic bubble) applications but not in thin film form suitable for high density magnetic recording media.

For a magnetic material such as cobalt and its alloys to have a high coercive field, it is known that the crystal structure of a film thereof should be that of the hexagonal (HCP) phase with high magneto-crystalline anisotropy. As noted by Chen et al. in U.S. Pat. No. 4,202,932, it is well known that pure cobalt metal in the HCP phase at a low temperature will transform to a face-centered cubic (FCC) phase at higher temperatures. The transformation of the cobalt film to FCC phase causes a decrease in the coercive field to a point where it is no longer useful as a medium for high density recording. Lazzari et al. in their paper entitled "Thin Evaporative Films With High Coercive Force," published in the IEEE Transactions on Magnetics, September, 1967 (Vol. Mag-3, No. 3, Page 205) report that a perturbation of the structure and morphology of the magnetic material (cobalt) by the presence of a nonmagnetic underlayer of chromium, permits the attainment of coercivities of from 200 to 600 Oe., which may be adjusted by varying the thickness of the cobalt layer. These workers achieved their results by the evaporation of successive films of chromium and cobalt, and obtained a maximum value of coercivity with a cobalt film thickness of 200 Å and the minimum with a cobalt film thickness of 1400 Å. Similar results were reported by M. T. Maloney for sputter-deposited films of cobalt and chromium in a paper entitled "Sputtered Multilayer Films For Digital Magnetic Recording" IEEE Transactions on Magnetics, (Vol. 15, No. 3, July 1979 at Page 1135).

The prior art references identified hereinbefore deal principally with the basic magnetic properties of cobalt alloys. Nigh et al., in U.S. Pat. No. 4,079,169, do disclose magnetic recording media utilizing a nonmagnetic cobalt-based alloy as a protective cladding or isolation layer for an aluminum substrate. Their magnetic layer is iron or cobalt or an alloy of iron and cobalt which is vacuum deposited on the cobalt-based alloy and then topped by a protective layer of a metal such as rhodium. Nigh et al. also suggest that an undercoat layer of chromium or titanium may be deposited on the isolation layer prior to forming the magnetic layer.

Shine, in U.S. Pat. No. 4,221,615, teaches the use of a 50—50 atomic percent platinum-cobalt alloy to provide a soft magnetic material for use as the oscillating ball in flowmeters and the like. U.S. Pat. No. 4,154,875 to Yanagisawa et al. discloses a magnetic recording member comprising a magnetic layer of electroless plated cobalt-nickel-phosphorus formed on an electroless plated nickel-phosphorus alloy layer which is disposed on an aluminum base. The magnetic layer is then provided with a protective coating formed of a polysilicate. The aforementioned U.S. Pat. No. 4,202,932, to Chen et al. mentions a number of cobalt alloys (cobalt-rhenium, cobalt-ruthenium, cobalt-osmium, or mixtures thereof), for magnetic recording media, but no alloy involves cobalt and platinum.

Besides having acceptable magnetic recording properties, it is highly desirable for magnetic recording discs to possess excellent wear properties and be stable against oxidation of the magnetic layer. It has been customary to provide recording discs with special layers or coatings to protect the underlying layers against wear and contamination. See, for example, U.S. Pat. Nos. 4,152,487 and 4,154,875, to Yanagisawa and Yanagisawa et al., respectively, where the use of protective polysilicate films is disclosed. Likewise, Thomas et al., in U.S. Pat. No. 4,079,169, teach the use of a hard protective layer of a precious metal such as rhodium.

Yanagisawa et al, in their U.S. Pat. No. 4,069,360, also teach the use of an inorganic oxide layer coated with a lubricant layer to protect and reduce frictional wearing of both the surface of the recording disc and the surface of the magnetic recording head. The inorganic oxide film disclosed in this patent is a polysilicate (such as quartz, glass, silicate glass, borite glass, borosilicate glass, phosphate glass, or amorphous aluminum). The lubricant disclosed may be silicone oil, fluoric oil, fluorosilicone oil and a silane or a silazane group as a surface coupling agent.

BRIEF SUMMARY OF THE INVENTION

When pure cobalt is deposted over chromium, the coercivity of the cobalt film varies markedly with film thickness. See the aforementioned papers of Lazzari et al. and Maloney et al. The present invention is based, at least in part, upon the discovery that the addition of platinum increases the film coercivity and that the resulting coercivity is less dependent upon film thickness and further that the remanent magnetization does not change or decrease sharply with the platinum content. Therefore, the magnetization-thickness product is dependent upon and varies principally with the film thickness. These features thus allow one to vary or adjust the coercivity and magnetization-thickness product factors independently. A desired magnetization-thickness product can be obtained by adjusting the cobalt-platinum film thickness without a large effect on the coercivity, and the coercivity can be adjusted to a desired value by varying the platinum content. In addition, small control variations of the coercivity can be obtained by varying the thickness of the chromium layer.

Thus, the combination of a cobalt-platinum alloy film disposed over a chromium layer provides a unique system in which the coercivity and the magnetization-thickness product can be varied independently over a wide range by changing the platinum content and film thickness of the cobalt-platinum layer. The ratio of the magnetization-thickness product to the coercivity determines the transition width between the recorded regions; the lower the ratio value, the higher the achievable recording density. Hence, by the present invention and for a given digital recording system (recording head and disc), the magnetic properties of the cobalt-platinum-layer-over-chromium system can readily be optimized to yield a maximum recording density, consistent with the available write field of the head and the required minimum value of output signal.

The thin film magnetic recording media or disc structure of the present invention is characterized by performance above the minimum read and resolution thresholds, while still permitting maximum recording density. The recording disc of the invention is formed by the sequential deposition by sputtering of four distinct layers onto a highly polished substrate. The first of these layers is a thin chromium isolation layer of from 1000 to 3000 Å thick to provide a barrier against contamination from the substrate and mask any local inhomogeneities in the substrate surface. In addition to this isolation function, the chromium underlayer also provides a mechanism to further control the coercivity of the magnetic layer.

The second and next layer is a sputtered magnetic cobalt-platinum film of from 125 to 1000 Å thick with the platinum content ranging from about 1 to about 20 atomic percent. Varying the platinum content and the film thickness permits the magnetic properties to be varied or tailored as desired. With a platinum content above 16 atomic percent, a coercivity of greater than 1,600 Oe. can be obtained.

The third or barrier layer disposed on the magnetic film may be of chromium of from 100 to 600 Å thick to provide stability against oxidation of the magnetic layer over the lifetime of the disc and especially during fabrication of the subsequent oxide wear layer.

The final layer is a wear layer which provides excellent protection against wear during the start/stop operations of the disc when it is apt to come into contact with the recording head. For example, a satisfactory and presently preferred wear layer may comprise one or more oxides of cobalt. It is believed that this wear layer is either $Co_3O_4$ or CoO or other non-stoichiometric combinations of cobalt and oxygen. In any event, the term "cobalt oxide", as used herein, means any of the oxides of cobalt as just defined. Phase diagrams of the cobalt-oxygen system reveal that at room temperature, the stable oxide phase is $Co_3O_4$, and theoxide changes its phase to CoO at temperatures above 900 degrees Centigrade.

DETAILED DESCRIPTION OF THE INVENTION

Figure 1:
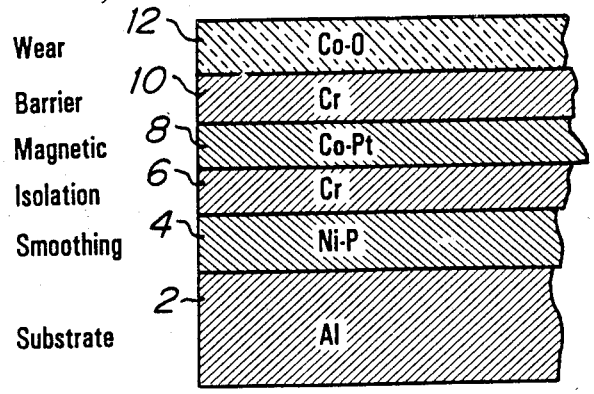
FIG. 1 is a cross-sectional view of a magnetic recording disc according to the invention.

Referring now to FIG. 1, a preferred embodiment of the thin film recording disc according to the invention is shown. The disc 1 includes a support substrate 2 of aluminum which may be about 0.075 inches thick. Since it is difficult to obtain a highly polished and sufficiently smooth aluminum surface, (that is, one without any scratches or polishing marks whatever), a smoothing or surface layer 4 of nickel-phosphorus is provided on the surface of the aluminum substrate 2. The nickel-phosphorus layer 4 is preferably about 0.0003 inches and may be up to about 0.001 inches in thickness and is deposited by electroless plating. Plated nickel phosphorus may be polished to a high degree of smoothness and provides a homogeneous, hard and smooth surface for the aluminum disc substrate.

An isolation layer 6 of chromium is sputter deposited onto the nickel-phosphorus film 4 and may be about 2,200 Å thick. Atop of the chromium isolation layer 6, a magnetic layer 8 of an alloy of cobalt and platinum is sputter deposited. As mentioned previously, the chromium layer 6 provides isolation of the magnetic layer 8 from the substrate and acts as a barrier against contamination from the substrate. In addition to its isolation properties, the chromium layer 6 improves the magnetic properties of magnetic films of cobalt-platinum alloys. Thus, the grain size and the degree of preferred in-plane orientation of the C axis of the magnetic film can be increased with such a chromium isolation layer. This permits an increase in coercivity and in the squareness of the in-plane M-H hysteresis loop, both of which are essential parameters in achieving high density recording. Furthermore, varying the thickness of this chromium layer permits further adjustments of the coercivity of the overlying cobalt-platinum film. For example, the coercivity of a cobalt-platinum alloy layer of about 410 Å in thickness, containing about 3 atomic percent platinum, can be varied continuously from about 450 to about 750 Oe by varying the thickness of the chromium underlayer from about 1,000 Å to about 3,000 Å.

Figure 2:
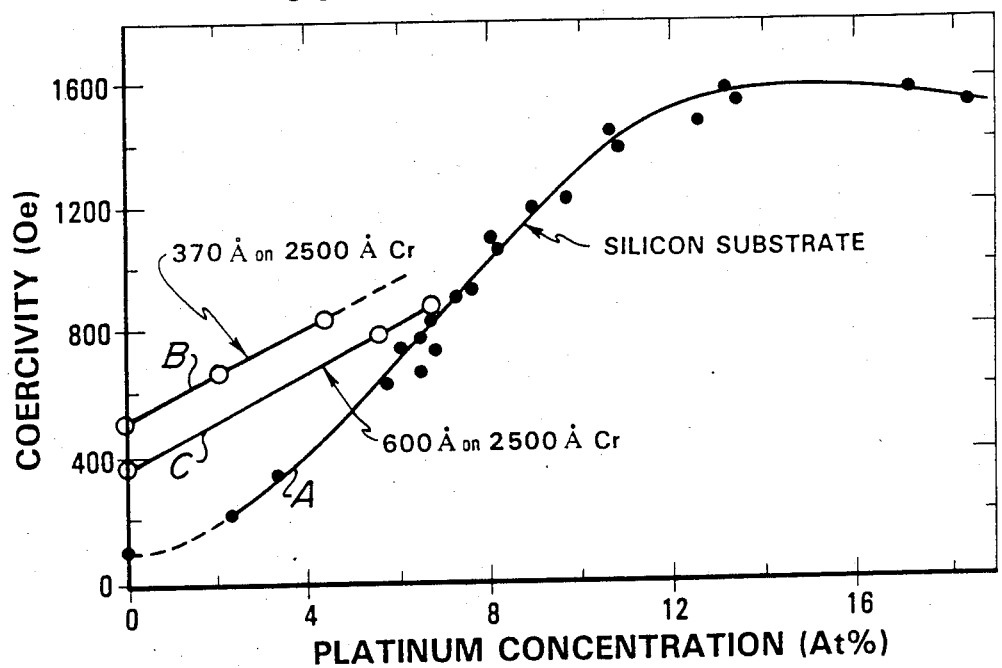
FIG. 2 is a diagram illustrating the coercivity of cobalt-platinum films plotted against platinum concentration with curves showing the coercivity of cobalt-platinum films deposited on chromium and on silicon.

The magnetic film 8 comprises an alloy of cobalt and platinum. In the presently preferred embodiment, the platinum content of the alloy is about 3 atomic percent which provides a coercivity of about 600 Oe and the film is about 410 Å thick. It is preferably at least 300 Å thick. By varying the platinum content, the magnetic properties of the magnetic film 8 can be tailored as desired. This may be readily understood by reference to FIG. 2 wherein Curve A shows the variation of coercivity with respect to the platinum content in cobalt-platinum films deposited on silicon. Curves B and C illustrate the coercivity of films having two different thicknesses (Curve B represents a film being 370 Å thick and Curve C a film being 600 Å thick) each deposited on chromium layers about 2,500 Å thick. It will be noted that the thinner films (Curve B) have a significantly higher coercivity than the thicker films for the same platinum content.

As stated above, the preferred platinum content in the cobalt-platinum alloy films of the invention, is about 3 atomic percent, which provides a coercivity of about 600 Oe. The coercivity has been found to be less sensitive to the presence of the chromium isolation layer 6 at higher platinum content than at the lower (less than 8 atomic percent) concentrations of platinum. Also the in-plane loop squareness does not vary significantly with the platinum content of cobalt-platinum films deposited over chromium.

After deposition of the cobalt-platinum magnetic film 8, a barrier layer 10 of chromium is sputtered over the magnetic film. The preferred thickness is about 500 Å, although thinner films may also be employed. The minimum thickness needed for protection of the underlying magnetic film is at least 100 Å, the primary criterion being the thickness at which the film is continuous, which is usually above 100 Å. While chromium is a preferred material for this barrier layer, other materials such as titanium, tantalum and zirconium may be employed. The requirements for the barrier layer 10 are: (1) that it adhere well to the magnetic layer thereabeneath and the wear layer thereabove; and (2) that it be chemically inert or nonreactive with either of the layers with which it is in contact. Since virtually all of the films formed and deposited to fabricate the preferred embodiment of the magnetic recording disc of the invention are achieved by sputtering (as will be described more fully hereinafter), and since the isolation layer 6 is of necessity chromium, chromium is preferred as the material for the barrier layer 10.

The final layer 12, the wear layer, is sputtered over the barrier film 10. This wear layer 12 is a cobalt oxide layer preferably about 420 Å in thickness. As previously noted, this cobalt oxide may be either $Co_3O_4$ or $CoO$ or other non-stoichiometric combinations of cobalt and oxygen or a complex mixture of two or more phases of the cobalt-oxygen system. The stable oxide phase is $Co_3O_4$ at room temperature, but since the sputtering process by which the film is formed according to the present invention is a non-equilibrium deposition process, the cobalt oxide wear layer is believed to be a non-stoichiometric mixture of cobalt and oxygen, either of the $Co_3O_4$ phase or the $CoO$ phase, or a mixture of both. The thickness can be as low as desired depending upon the expected or desired number of start/stop operations for the disc. (It will be understood that the magnetic recording head is in contact with the disc as it begins to spin up and again as the disc slows down and stops.) A cobalt oxide film of 500 Å, for example, was found in tests to survive over 20,000 stop/start operations. A wear layer thickness of 250 Å was likewise found to suffer little degradation after 10,000 continuous stop/starts. The wear layer 12 thus described provides a low coefficient of friction and wear properties that are relatively independent of the relative humidity below 50%. While a cobalt oxide wear layer is presently preferred, the oxides of other materials may be employed, including but not limited to, titanium, silicon and aluminum.

Except for the initial layer 4 of nickel-phosphorus, the various layers of the recording disc of the invention are prepared by sputtering processes which are well known in the art. The nickel-phosphorus layer 4 is formed on the surface of the aluminum substrate 2 by electroless plating. The surface of the aluminum substrate is prepared by a zincate pre-treat cycle well known in the art. A detailed description of this pre-treat cycle may be found in a paper presented by C. P. Nargi on Mar. 17, 1981 at the Electroless Nickel Conference II, entitled "Surface Treatments for Electroless Nickel Plating" published by Gardner Publications, Inc., 600 Main St., Cincinnati, Ohio. Electroless nickel plating is well known and a detailed description thereof is found in ELECTROPLATING ENGINEERING HANDBOOK (Third Edition), edited by A. Kenneth Graham and published 1971 by Van Nostrand Rhinehold Company, New York, N.Y., with special reference to pages 488–501. After cleaning and polishing the nickel-phosphorus plated disc, it is placed in a sputtering chamber, and the remaining layers may be formed in succession without removing the disc from the chamber or system of chambers.

The chromium isolation layer 6 is sputter-deposited using a chromium target in an argon atmosphere at a pressure of about 7 millitorr, for example. Using a DC magnetron sputtering technique to minimize substrate heating, a chromium film of about 2200 Å can be formed in about 7.5 minutes. It will be appreciated that the rate of sputter deposition is primarily dependent upon the magnitude of the power supplied to the magnetron.

The disc is then moved to an adjacent sputter chamber and the magnetic layer 8 is formed on the chromium isolation layer 6 by RF diode sputtering using a composite target comprised of platinum and cobalt. The process is practiced in an argon atmosphere at a pressure of about 10 millitorr, for example. The percentage of platinum desired to be alloyed with the sputtered cobalt determines the ratio of the exposed area of platinum to the exposed area of cobalt on the target surface. By this process, a cobalt-platinum layer 8, of preferably about 3 atomic percent platinum and of about 410 Å thickness is formed in about 2 minutes using about 0.6 watts/cm$^2$.

The disc is next moved to a sputter chamber where the chromium barrier layer 10 may be formed. The atmosphere is again argon at a pressure of about 7 millitorr. The target, of course, is chromium, and since the barrier layer 10 is about 500 Å in thickness, the sputter time is only about 1.5 to 2 minutes, again using a DC magnetron.

The wear layer 12 is formed on the chromium barrier layer 10 by sputter-depositing a layer of cobalt oxide thereon. To achieve the formation of this layer, a cobalt target is employed in an atmosphere of argon (80%) and oxygen (20%) at a pressure of about 15 millitorr. A layer of about 425 Å in thickness is formed in about 9 minutes using the RF diode sputtering technique at about 0.6 watts/cm$^2$.

Figure 3:
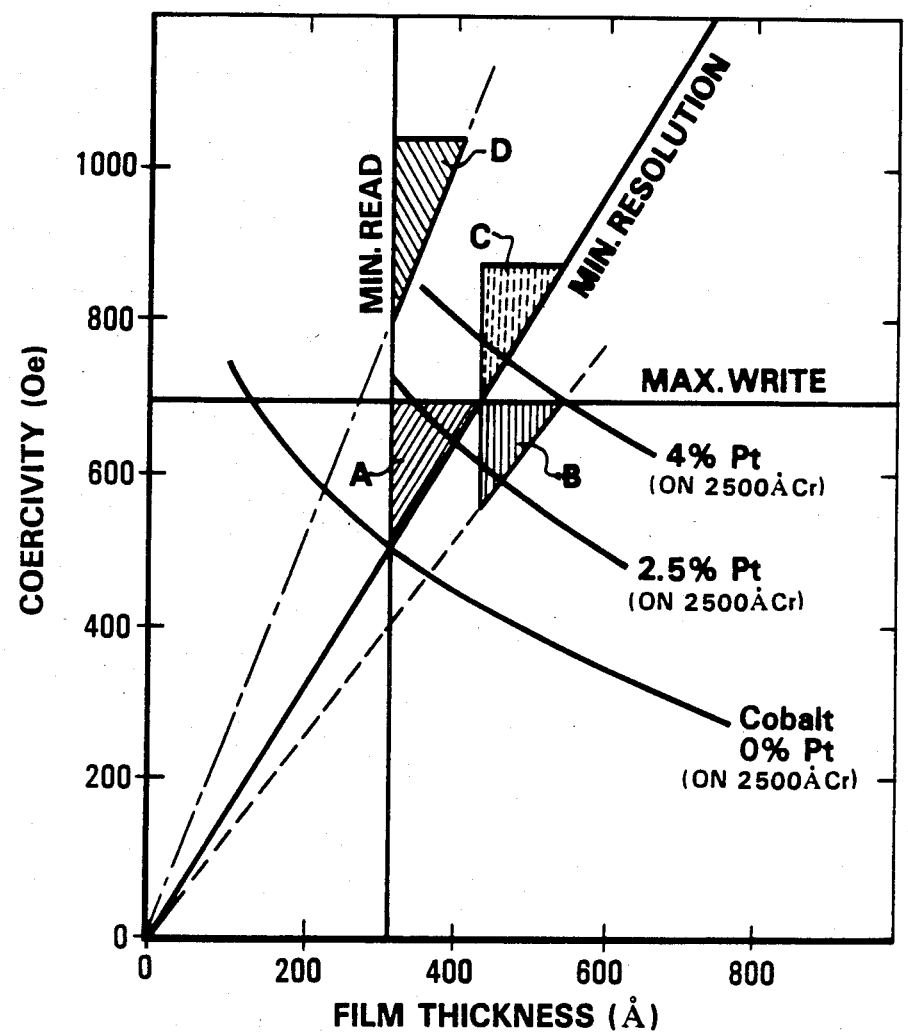
FIG. 3 is a diagram illustrating the properties of thin film discs with respect to the constraints imposed by a typical recording/writing head system.

FIG. 3 illustrates how the design of a magnetic recording disc may be tailored to meet some typical desired system constraints. The system constraints are a write field below an acceptable maximum, a minimum read capability, and a minimum resolution. These constraints are shown to define a small area rather than a point to allow for inevitable small variation in system parameters. The maximum write field determines the desired coercivity of the magnetic film. As depicted in FIG. 3 this may be achieved by selecting a cobalt-platinum film having an appropriate platinum content. It will be seen that any one of the three curves shown will permit operation at the coercivity determined by the available maximum write current, for example. However, while this particular objective may be met by cobalt films having a platinum content of from 0 to 4 atomic percent, only a magnetic film having a platinum content of about 2.5 atomic percent will satisfy both of the other constraints: namely, acceptable minimum resolution and minimum read capability. With the level of the maximum write current depicted, only one of the films depicted will satisfy the constraints imposed by the head properties and system design, and this is a film having a platinum content of about 2.5 atomic percent and a thickness of between 300 Å and 420 Å. These three parameters (maximum write current, a minimum read capability, and a minimum resolution) define the Triangle A shown on the plot in FIG. 3; only the 2.5 percent cobalt-platinum film traverses this Triangle. It is equally clear that should the system design require operation with the same maximum write field and a larger output read signal, the triangle moves to the right to the position designated by Triangle B. Increasing the film thickness with a slight change in platinum concentration permits a new match to the disc design requirements. It should be noted that resolution may be decreased unless there is a compensating reduction in recording density.

Triangle C illustrates an example where the same resolution as for Triangle A is achieved with a head requiring a greater magnetization-thickness product for signal output but capable of writing at higher fields. Triangle D is representative of a system in which a higher resolution is achieved with a head capable of writing at higher fields and requiring no increase in signal output. It is readily seen that a suitable independent choice of platinum concentration and film thickness allows the match of disc magnetic properties to the desired values.

Thus, by varying the thickness of the cobalt-platinum films and/or the platinum content thereof according to the invention, magnetic recording discs may be fabricated to meet a wide range of recording system design parameters. Furthermore, discs made according to the invention exhibit not only highly desirable and controllable magnetic properties but excellent stability against oxidation and wear. The present invention provides these advantages with a relatively straight-forward manufacturing process readily adaptable to continuous or batch processing with little or no complex procedures and operations.

What is claimed is:

1. A method of providing a film of an alloy of cobalt and platinum having certain magnetic properties comprising:
    (a) forming a layer of chromium on a substrate;
    (b) depositing said film of said alloy of cobalt and platinum on said layer of chromium;
    (c) forming said film to a predetermined thickness to obtain a predetermined magnetization-thickness product thereof; and
    (d) setting the percentage of platinum of said alloy to obtain a predetermined coercivity, said percentage of platinum ranging from about 1 to about 20 atomic percent.

2. The method of claim 1 wherein said chromium layer is formed to a predetermined thickness to further adjust said coercivity.

3. The method of claim 1 wherein a barrier layer is disposed on said magnetic layer.

4. The method of claim 3 wherein said barrier layer is a material selected from the group consisting of chromium, titanium, tantalum and zirconium.

5. The method of claim 4 wherein said barrier layer is chromium.

6. The method of claim 1 wherein said magnetic layer contains from about 1.5 to 7 atomic percent platinum.

7. The method of claim 6 wherein said magnetic layer contains about 3 atomic percent platinum.

8. The method of claim 1 wherein a wear layer is disposed on said barrier layer.

9. The method of claim 8 wherein said wear layer is a material selected from the group consisting of the oxides of cobalt, titanium, silicon and aluminum.

10. The method of claim 9 wherein said wear layer is cobalt oxide.

11. A method of providing a magnetic film of an alloy of cobalt and platinum supported on a substrate and having a predetermined coercivity and predetermined magnetization-thickness product obtained by:
    (a) forming a layer of chromium or said substrate to a predetermined thickness to provide a secondary adjustment of said coercivity; and (b) depositing said magnetic film of said alloy of cobalt and platinum on said layer of chromium to a predetermined thickness to provide said predetermined magnetization-thickness product, said alloy formed containing predetermined amount of said platinum to provide a primary adjustment of said coercivity.

12. The method of claim 11 wherein said predetermined amount of said platinum ranges from about 1 to about 20 atomic percent.

13. The method of claim 12 wherein said predetermined amount of said platinum ranges from about 1.5 to 7 atomic percent.

14. The method of claim 13 wherein said predetermined amount of said platinum is about 3 atomic percent.

15. The method of claim 11 wherein predetermined thickness of said chromium layer ranges from about 1,000 to 3,000 Å.

16. The method of claim 11 wherein said predetermined thickness of said magnetic film ranges from about 125 to 1,000 Å.

17. A method of fabricating a magnetic recording disc including a magnetic film supported on a substrate having a predetermined magnetization-thickness factor and a predetermined coercivity comprising:
    (a) forming a surface layer of an alloy of nickel and phosphorus on a substrate of aluminum;
    (b) forming a layer of chromium on said surface layer;
    (c) forming said chromium layer to a predetermined thickness to adjust said coercivity of said magnetic film;
    (d) depositing said magnetic film comprising an alloy of cobalt and aluminum on said layer of chromium;
    (e) forming said film to a predetermined thickness to obtain said predetermined magnetization-thickness factor;
    (f) setting the percentage of platinum of said alloy to obtain said predetermined coercivity, said percentage of platinum ranging from about 1 to about 20 atomic percent;
    (g) forming a barrier layer on said magnetic film; and
    (h) forming a wear layer on said barrier layer.

18. The method of claim 17 wherein said layer of chromium is formed to a thickness of at least about 1,000 Å, said magnetic film is formed to a thickness of at least about 125 Å, said barrier layer is formed to a thickness of at least about 100 Å and said wear layer is formed to a thickness of at least about 250 Å.

19. The method of claim 17 wherein said barrier layer is a material selected from the group consisting of chromium, titanium, tantalum and zirconium.

20. The method of claim 19 wherein said barrier layer is chromium.

21. The method of claim 17 wherein said wear layer is a material selected from the group consisting of the oxides of cobalt, titanium, silicon and aluminum.

22. The method of claim 21 wherein said wear layer is cobalt oxide.

23. The method of claim 17 wherein said magnetic layer contains from about 1.5 to 7 atomic percent platinum.

24. The method of claim 23 wherein said magnetic layer contains about 3 atomic percent platinum.

25. A method of fabricating a magnetic recording disc including a magnetic film supported on a substrate of aluminum, said magnetic film having a predetermined magnetization-thickness factor and a predetermined coercivity comprising:
    (a) forming a surface layer of an alloy of nickel and phosphorus on a substrate of aluminum;
    (b) forming a layer of chromium on said surface layer;
    (c) forming said chromium layer to a predetermined thickness ranging from about 1,000 to 3,000 Å to provide a secondary adjustment of said coercivity of said magnetic film;
    (d) depositing said magnetic film comprising an alloy of cobalt and aluminum on said layer of chromium, said magnetic film being deposited to a thickness ranging from about 125 to 1,000 Å;
    (e) forming said film to a predetermined thickness to obtain said predetermined magnetization-thickness factor;
    (f) setting the percentage of platinum of said alloy to provide a primary adjustment of said coercivity, said percentage of platinum ranging from about 1 to about 20 atomic percent;
    (g) forming a barrier layer ranging in thickness from about 100 to 600 Å on said magnetic film, said barrier layer comprising a material selected from the group consisting of chromium, titanium, tantalum and zirconium; and
    (h) forming a wear layer at least about 250 Å thick on said barrier layer, said wear layer comprising a protective material selected from the group consisting of the oxides of cobalt, titanium, silicon and aluminum.

26. The method of claim 25 wherein said percentage of platinum ranges from about 1.5 to 7 atomic percent.

27. The method of claim 26 wherein said percentage of platinum is about 3 atomic percent.

28. The method of claim 27 wherein said layer of chromium is about 2,200 Å thick, said magnetic film is about 410 Å thick, said barrier layer comprises chromium about 500 Å thick and said wear layer comprises cobalt oxide about 420 Å thick.

29. The method of claim 26 wherein said substrate member is about 0.075 inches thick and said surface layer thereon is about 0.0003 inches thick.

30. A method of making a magnetic recording disc comprising a substrate member and a magnetic film formed thereon, said method including forming a layer of chromium on said substrate member and depositing a magnetic film on said chromium layer, said magnetic film comprising an alloy of cobalt and platinum containing from about 1 to about 20 atomic percent platinum, said magnetic film being formed to a predetermined thickness to provide a predetermined magnetization-thickness product and having a predetermined concentration of platinum to provide a coercivity in a predetermined range, said layer of chromium being formed to a predetermined thickness to further adjust the value of said coercivity.

* * * * *